United States Patent [19]

Kleine

[11] 4,275,796

[45] Jun. 30, 1981

[54] ROCK DRILLING TOOL

[75] Inventor: Werner Kleine, Achim, Fed. Rep. of Germany

[73] Assignee: Gebruder Heller Verwaltungsgesellschaft mit beschrankter Haftung, Achim-Uphusen, Fed. Rep. of Germany

[21] Appl. No.: 12,576

[22] Filed: Feb. 15, 1979

[30] Foreign Application Priority Data

Feb. 20, 1978 [DE] Fed. Rep. of Germany ....... 2807156

[51] Int. Cl.³ .......................................... E21C 13/08
[52] U.S. Cl. .................... 175/385; 175/410
[58] Field of Search ............... 175/385, 386, 389, 390, 175/391, 392, 410

[56] References Cited

U.S. PATENT DOCUMENTS

| 1,351,003 | 8/1920 | Pace | 175/386 |
|---|---|---|---|
| 2,759,705 | 8/1956 | Bjorkman | 175/389 |
| 3,321,034 | 5/1967 | Webb | 175/390 |
| 3,469,641 | 9/1969 | Reynolds | 175/389 |
| 3,960,223 | 6/1976 | Kleine | 175/385 |

Primary Examiner—James A. Leppink
Attorney, Agent, or Firm—Thomas R. Morrison

[57] ABSTRACT

A central pilot shaft having a cutting member at its end protrudes forward from the axis of a circular bracket disc which has a plurality of cutting members arranged on its periphery. An exhaust channel permits removing fine particles from in front of the bracket disc.

8 Claims, 3 Drawing Figures

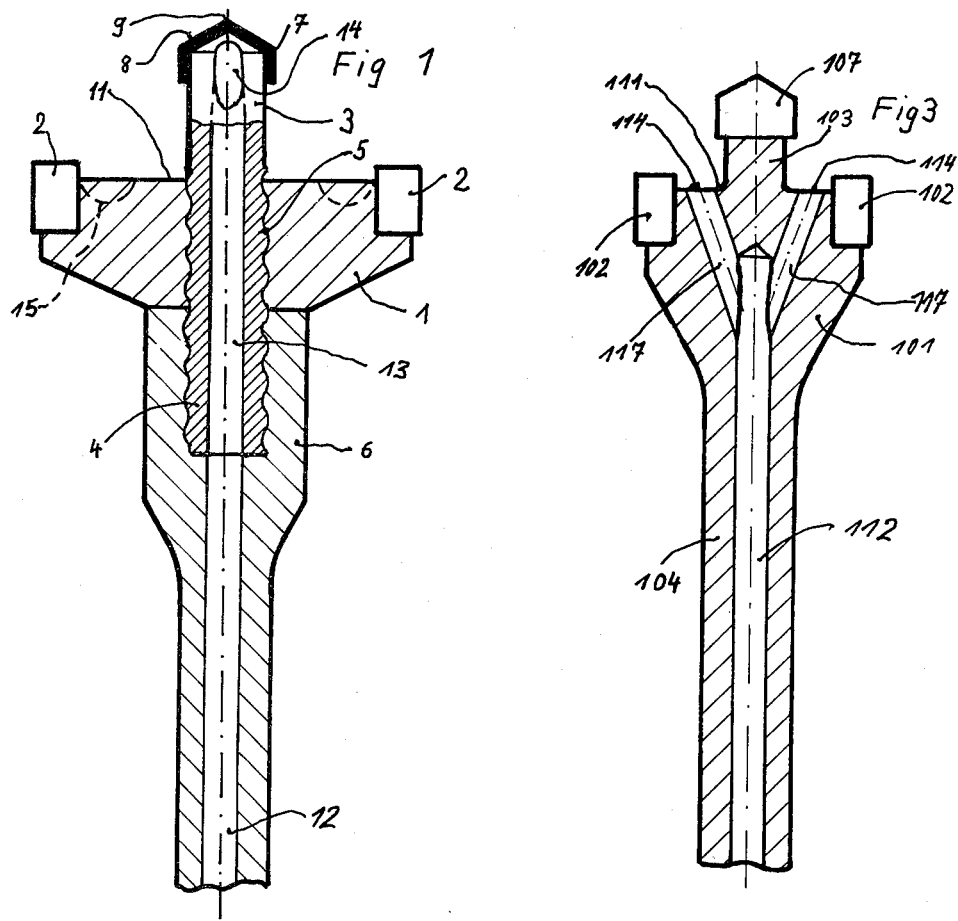
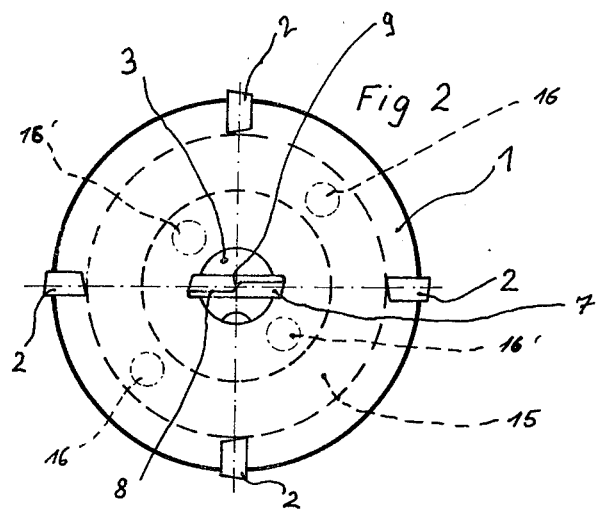

ROCK DRILLING TOOL

BACKGROUND OF THE INVENTION

The present invention relates to rock drilling tools and particularly to cross-impact rock drilling tools.

A cross-impact rock drilling tool in the prior art employs a central pilot shaft with a cutting member at its tip and cross-shaped arms protruding outward from the pilot shaft with cutting members at their ends. Such drills are reciprocated in a drill hole while also being rotated. The cutting member on the pilot shaft bores a pilot hole while the cutting members at the ends of the arms spaced radially outward from the pilot shaft crush a ring of rock. The annular ring of rock between the pilot hole and the crushed ring is crushed by impact with the arms.

When drilling upward, both large and small particles of crushed rock can fall through the spaced between the arms onto the face of the person holding the drill. When drilling downward, fine rock particles accumulate in the hole and cushion the impact of the drill and thus impair drilling effectiveness. In addition, the manufacture of cross-impact drills employing a plurality of radial arms is relatively expensive.

OBJECTS AND SUMMARY OF THE INVENTION

It is an object of the present invention to provide a cross-impact drill which avoids the drawbacks of the prior art.

It is a further object of the invention to provide a rock drilling tool which is cheaper to manufacture.

It is a further object of the invention to provide a rock drilling toll which prevents rock particles from falling downward while drilling upward and also prevents interference with drilling efficiency when drilling downward.

The above and other objects of the invention are accomplished by providing a rock drilling tool comprising a circular bracket disc having a front face, a central pilot shaft axially disposed on the circular bracket disc and protruding forward therefrom, a tool shaft supporting the bracket disc and the central pilot shaft, a first cutting member at the forward end of the central pilot shaft, a plurality of second cutting members disposed on the bracket disc, the second cutting members extending axially forward a first predetermined distance beyond the bracket disc and extending radially outward a second predetermined distance beyond the bracket disc and exhaust channel means for withdrawing fine drilled material from forward of the front face of the bracket disc through the tool shaft.

The bracket disc is a circular disc. It therefore requires only a narrow gap between itself and the side of the drilled hole for clearance during drilling. When air is drawn from forward of the bracket disc during drilling, a high velocity flow of air forward past the perimeter of the bracket disc is produced which has sufficient speed to prevent fine particles from escaping through the gap and which forces them toward the opening of the exhaust channel.

The disc shape of the bracket disc improves the crushing performance of the tool since the entire front face of the bracket disc is available for crushing the rock rather than just the arms as in the prior art. Furthermore, the disc face ensures that the rock is crushed fine enough that it can be completely removed through the exhaust channel. Such continuous removal of crushed rock prevents the fine particles from forming a cushion which would absorb the impact of the drill when drilling downward and impede the progress of the work. Therefore drilling proceeds at a faster pace.

The simple round disc shape of the bracket disc is easier to manufacture and therefore production costs are significantly reduced. Furthermore, the full disc shape of the bracket disc adds strength to the assembly. Therefore, a drilling tool according to the present invention can be produced having the same strength as drills of the prior art but with reduced weight. In addition, the improved rigidity imparted by the disc shaped bracket disc improves the transfer of impact power and further contributes to improved performance.

The present invention contemplates placing the opening of the exhaust channel anywhere forward of the front face of the bracket disc. In a preferred embodiment, the opening for the exhaust channel is located intermediate the length of the central pilot shaft in a location well forward of the most forward location of the cutting members on the bracket disc. Thus, the opening is located within the hole produced by the central pilot shaft. By providing an overhang of the cutting member on the forward end of the central pilot shaft, an annular space is created between the hole drilled in the rock and the surface of the central pilot shaft. The size of this annular space is smaller than the size of the opening leading to the exhaust channel. Therefore, large particles of rock which could clog the opening are prevented from reaching it until after they have been further reduced in size.

The above and other objects, features and advantages of the present invention will become apparent from the following description read in conjunction with the accompanying drawings.

BRIEF DESCRIPTION OF THE DRAWINGS

FIG. 1 shows a partially cross sectional longitudinal view of a rock drilling tool according to an embodiment of the invention.

FIG. 2 shows an end view of the rock drilling tool of FIG. 1.

FIG. 3 shows a cross sectional view of a rock drilling tool according to a second embodiment of the invention.

DETAILED DESCRIPTION OF THE PREFERRED EMBODIMENT

Referring to FIGS. 1 and 2, there is shown a rock drilling tool according to an embodiment of the present invention. A central pilot shaft 3 having a cutting member 7 affixed in a slot in the end thereof axially protrudes from a circular bracket disc 1. The cutting member 7 has a cutting edge 8 at the forward end thereof and tapers to a tip 9.

A plurality of cutting members 2 are arranged about the perimeter of bracket disc 1 and protrude both forward in the same direction as the central pilot shaft and radially beyond the boundary of bracket disc 1.

A tool shaft 6 is affixed at the rear of bracket disc 1. Central pilot shaft 3, bracket disc 1 and tool shaft 6 may be connected together by any appropriate means such as by welding or integral manufacture, but in the preferred embodiment, central pilot shaft 3 contains external threads 5 on a shaft portion thereof which mates with corresponding internal threads in bracket disc 1 and tool shaft 6.

An exhaust channel 12 axially located in tool shaft 6 mates with an exhaust channel 13 axially located in central pilot shaft 3. Exhaust channel 13 is terminated in an opening 14 near the forward end of central pilot shaft 3.

A front face 11 of bracket disc 1 is preferably a plane surface for crushing rock.

Cutting members 2 and 7 become dull in use and must periodically be sharpened by grinding. In order to prevent the creation of stress risers in the front face 11 of bracket disc 1 due to grit marks during grinding, an annular groove 15 having a substantially semi-circular cross section, shown in dashed line FIGS. 1 and 2, may be provided in front face 11.

Referring to FIG. 2, hardened pins 16 may be located in groove 15 to aide in crushing rock. Hardened pins 16' which may optionally be disposed along different radii from hardened pins 16 may be located on front face 11 between groove 15 and central pilot shaft 3 to also assist in crushing rock.

As the embodiment of the invention shown in FIGS. 1 and 2 reciprocates and rotates in a hole, cutting edge 8 on central pilot shaft 3 bores a substantially circular hole which, due to the overhang of cutting member 7 beyond the sides of central pilot shaft is slightly greater in diameter than central pilot shaft 3. Therefore, an annular space is created between the central drilled hole and central pilot shaft 3. The width of the annular space is substantially smaller than the size of opening 14. Therefore, during drilling, large rock particles which could clog opening 14 are prevented from traversing the annular space to opening 14 but smaller particles are permitted to reach opening 14 and are drawn exhaust channels 13 and 12 by a vacuum applied thereto.

Similarly, the forward edges of cutting members 2 drill and crush an annular area in the rock face. The rock between the annular area and the central hole is crushed by a front face 11 optionally aided by hardened pins 16 and 16'. The radial overhang of cutting members 2 beyond the perimeter of bracket disc 1 creates an annular gap between the perimeter of bracket disc 1 and the hole. Due to the vacuum applied at opening 14, an inrush of air past the perimeter of front face 1 prevents fine drilling particles from escaping about the perimeter of bracket disc 1. Thus, fine drilling particles are withdrawn from the front surface of bracket disc 1 only through the opening 14 and exhaust channels 13 and 12 whereas larger rock particles remain between front face 11 and the rock surface until crushed finely enough to be drawn to and through opening 14.

A second embodiment of the invention is shown in FIG. 3 in which a central pilot shaft 103, bracket disc 101 and tool shaft 104 are integrally formed. A cutting member 107 is affixed to central pilot shaft 103 and cutting members 102 are affixed to bracket disc 101 corresponding to cutting members 7 and 2 of FIGS. 1 and 2.

A blind exhaust bore 112 is axially disposed in tool shaft 104 and extends into bracket disc 101. Connection bores 117 connect openings 114 in plane front surface 111 of bracket disc 101 with blind exhaust bore 112 in order that drilling debris may be removed from in front of bracket disc 101.

Having described a specific preferred embodiment of the invention with referece to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. A rock drilling tool comprising:
   (a) a bracket means having a circular front face and an uninterrupted cylindrical circumferential surface, said circumferential surface forming a radially outermost surface of said bracket means;
   (b) a central pilot shaft axially disposed in said bracket means and protruding forward therefrom;
   (c) a tool shaft supporting said bracket means and said central pilot shaft;
   (d) a first cutting member at the forward end of said central pilot shaft;
   (e) a plurality of second cutting members disposed on said bracket means radially spaced outward from said first cutting member whereby an annular portion of said circular front face is disposed radially outside of said first and radially inside of said second cutting members for crushing the rock not engaged by said first and second cutting members;
   (f) said second cutting members extending axially forward a predetermined distance beyond said circular front face and extending radially outward a second predetermined distance beyond said cylindrical circumferential surface;
   (g) exhaust channel means for withdrawing fine drilled material from forward of said front face through said tool shaft; and
   (h) said front face being substantially plane.

2. A rock drilling tool according to claim 1 further comprising an annular groove within said annular portion of said front face.

3. A rock drilling tool comprising:
   (a) a bracket means having a circular front face and an uninterrupted cylindrical circumferential surface, said circumferential surface forming a radially outermost surface of said bracket means;
   (b) a central pilot shaft axially disposed in said bracket means and protruding forward therefrom;
   (c) a tool shaft supporting said bracket means and said central pilot shaft;
   (d) a first cutting member at the forward end of said central pilot shaft;
   (e) a plurality of second cutting members disposed on said bracket means radially spaced outward from said first cutting member whereby an annular portion of said circular front face is disposed radially outside of said first and radially inside of said second cutting members for crushing the rock not engaged by said first and second cutting members;
   (f) said second cutting members extending axially forward a predetermined distance beyond said circular front face and extending radially outward a second predetermined distance beyond said cylindrical circumferential surface;
   (g) exhaust channel means for withdrawing fine drilled material from forward of said front face through said tool shaft;
   (h) an opening for said exhaust channel means in said central pilot shaft axially spaced forward of said second cutting members; and
   (i) said first cutting member extends radially a third predetermined distance beyond said central pilot shaft whereby an annular space is produced between a hole bored by said first cutting member and said central pilot shaft and wherein said opening has a dimension greater than the radial dimension of said annular space.

4. A rock drilling tool comprising:
(a) a bracket means having a circular front face and an uninterrupted cylindrical circumferential surface, said circumferential surface forming a radially outermost surface of said bracket means;
(b) a central pilot shaft axially disposed in said bracket means and protruding forward therefrom;
(c) a tool shaft supporting said bracket means and said central pilot shaft;
(d) a first cutting member at the forward end of said central pilot shaft;
(e) a plurality of second cutting members disposed on said bracket means radially spaced outward from said first cutting member whereby an annular portion of said circular front face is disposed radially outside of said first and radially inside of said second cutting members for crushing the rock not engaged by said first and second cutting members;
(f) said second cutting members extending axially forward a predetermined distance beyond said circular front face and extending radially outward a second predetermined distance beyond said cylindrical circumferential surface;
(g) exhaust channel means for withdrawing fine drilled material from forward of said front face through said tool shaft;
(h) an opening for said exhaust channel in said front face; and
(i) a dimension of said opening exceeds said second predetermined distance.

5. A rock drilling tool comprising:
(a) a bracket means having a circular front face and an uninterrupted cylindrical circumferential surface, said circumferential surface forming a radially outermost surface of said bracket means;
(b) a central pilot shaft axially disposed in said bracket means and protruding forward therefrom;
(c) a tool shaft supporting said bracket means and said central pilot shaft;
(d) a first cutting member at the forward end of said central pilot shaft;
(e) a plurality of second cutting members disposed on said bracket means radially spaced outward from said first cutting member whereby an annular portion of said circular front face is disposed radially outside of said first and radially inside of said second cutting members for crushing the rock not engaged by said first and second cutting members;
(f) said second cutting members extending axially forward a predetermined distance beyond said circular front face and extending radially outward a second predetermined distance beyond said cylindrical circumferential surface;
(g) exhaust channel means for withdrawing fine drilled material from forward of said front face through said tool shaft; and
(h) said bracket means has the form of a circular disc.

6. A rock drilling tool according to claim 5 further comprising threaded means for detachably connecting said bracket disc and said central pilot shaft.

7. A rock drilling tool according to claim 6 wherein said threaded means includes threads in said tool shaft.

8. A rock drilling tool according to claim 7 wherein said central pilot shaft contains threads engageable with said threads in said tool shaft.